United States Patent [19]
Chaffanjon et al.

[11] Patent Number: 5,767,324
[45] Date of Patent: Jun. 16, 1998

[54] POLYOLS

[75] Inventors: Pierre Gilbert Henri Jean Chaffanjon, Tervuren, Belgium; Minh Son Le, Cheshire, United Kingdom; Robert Henry Carr, Bertem, Belgium; Howard Matthew Colquhoun, Cheshire, United Kingdom; Jan Frans Hernalsteen, Everberg; Julien Armand Devos, Boutersem, both of Belgium

[73] Assignee: Imperial Chemical Industries PLC, London, England

[21] Appl. No.: 744,546

[22] Filed: Nov. 6, 1996

Related U.S. Application Data

[63] Continuation of Ser. No. 245,400, May 18, 1994, abandoned, which is a continuation of Ser. No. 119,277, Sep. 9, 1993, abandoned.

[30] Foreign Application Priority Data

Jun. 15, 1993 [GB] United Kingdom ............... 9312256

[51] Int. Cl.$^6$ ................................................ C07C 43/11
[52] U.S. Cl. ................................... 568/621; 568/613
[58] Field of Search ........................... 568/613, 621

[56] References Cited

U.S. PATENT DOCUMENTS

| 3,941,849 | 3/1976  | Herold.   |
| 4,355,188 | 10/1982 | Herold.   |
| 4,687,851 | 8/1987  | Laughner. |
| 4,764,567 | 8/1988  | Ott.      |
| 4,946,939 | 8/1990  | Murphy.   |
| 5,185,420 | 2/1993  | Smith.    |

Primary Examiner—Alan Siegel

[57] ABSTRACT

Process for reducing the level of unsaturation in a polyether polyol having an oxypropylene content of at least 30% by weight calculated on the total amount of oxyalkylene units in the polyol and having a number average equivalent weight of at least 1000 by subjecting the polyol to ultrafiltration.

8 Claims, No Drawings

POLYOLS

This application is a continuation of Ser. No. 08/245,400 filed May 18, 1994, now abandoned which is a continuation of Ser. No. 08/119,277 filed Sep. 09, 1993, now abandoned.

The present invention is concerned with a process for preparing polyether polyols having an oxypropylene content of at least 30% by weight calculated on the total amount of oxyalkylene units in the polyol said polyols having a very low level of unsaturation and with such polyether polyols.

The preparation of polyols having a low level of unsaturation has been described extensively in the prior art; see e.g. U.S. Pat. Nos. 3,941,849, 4,355,188, 4,687,851, 4,764,567 and 5,185,420.

Although the level of unsaturation of polyols according to this prior art may be rather low, there remains room for improvement.

Surprisingly we have found that by subjecting polyether polyols, having an oxypropylene content of at least 30% by weight calculated on the total amount of oxyalkylene units in the polyol, to ultrafiltration polyols may be obtained having an extremely low level of unsaturation; a level which is substantially lower than any of the polyols known to date having the same PO content and OH value. In addition to this it has been found that by applying ultrafiltration the polymeric material carrying the unsaturation (hereinafter called the mono-ols) may be removed from the polyol preferentially with respect to another by-product often present in such polyols; i.e. diols having a relatively low molecular weight compared to the molecular weight of the major component (i.e. the intended polyol) in the polyol; said relatively low molecular weight diols having a molecular weight which is at least partially overlapping with the molecular weight of the mono-ols. Although these relatively low molecular weight diols, which are formed during the oxyalkylating process due to the presence of water in the initiator and/or the alkylene oxide, in principle are unwanted by-products they nevertheless have some value in that their polymer backbone will be fully integrated in the polyurethane polymer network while the mono-ols at least will give pendant chains. Although the mono-ols and low molecular weight diols have a—often a substantially—overlapping molecular weight distribution, surprisingly the mono-ols may be removed preferentially from the polyol. This reduces the amount of waste.

Consequently the present invention is concerned with a process for reducing the level of unsaturation in a polyether polyol having an oxypropylene content of at least 30% by weight calculated on the total amount of oxyalkylene units in the polyol and having a number average equivalent weight of at least 1000 characterised in that the reduction of the level of unsaturation is conducted by subjecting the polyols to ultrafiltration.

Further the present invention is concerned with a polyether polyol having an oxypropylene content of at least 30% by weight calculated on the total amount of oxyalkylene units in the polyol, having a number average equivalent weight of at least 1000 and wherein the ratio (Y) of the total number of unsaturated groups over the total number of end groups is less than 400 X, wherein $$X = \frac{(1-b) \cdot 10^{-3}}{OH_v},$$

wherein $OH_v$ = the OH value in mg KOH/g and b is the amount of oxyethylene units in the polyol in % by weight, calculated on the total amount of oxyalkylene units in the polyol, divided by 100.

Preferably Y is less than 350 X and more preferably less than 300 X. Since generally some minor amount of unsaturation will remain in the polyol after ultrafiltration, Y generally will be at least 50 X.

The OH value in the above formula is determined by end group analysis and quantifies the concentration of hydroxyl groups per unit weight of polyol. It is expressed in the unit of mg KOH/g. The full method is described in the Standard Official Methods of Analysis of ICI Polyurethanes under the reference ICI/OH-1 which is obtainable from ICI Polyurethanes.

b is determined by $C^{13}$ NMR analysis.

Y in the above formula is determined as follows: the Y parameter (unsaturated groups over the total number of end groups) as well as the monool by-product (M), diol by-product (D) and intended polyol (T) molar levels are determined from 13 C NMR analysis. The chemical shifts, in ppm units, are expressed versus the TMS (tetramethylsilane) as the reference. Inverse gated decoupling and a sufficiently long pulse repetition delay are used to obtain quantitative spectra. The peak areas are determined by digital integration of the various regions of the resulting spectra.

From these 13C NMR spectra, the following integration data are used:

* A1: Average of the two areas under the two peaks of the two carbons of the double bonds. These two peaks are in the 110–140 ppm range of the spectrum and are single peaks.
* A21: Total area under the group of peaks of the carbon in alpha position of secondary hydroxyl end groups. The peaks are in the 65–68 ppm range.
* A22: Total area under the group of peaks of the carbon in alpha position of primary hydroxyl end groups. The peaks are in the 61–63 ppm range.
* A3: Area of the peak from the initiator, normalised to one carbon per molecule. In case of the example (nominal triol, glycerol initiated), the peak is in the 78–79 ppm range.

The different parameters are then calculated by the following formulas:

$$Y = \frac{A1}{A1 + A21 + A22}$$

$$M = \frac{A1}{A1 + A3 + B} \text{ expressed in mole \%}$$

$$D = \frac{B}{A1 + A3 + B} \text{ expressed in mole \%}$$

$$T = \frac{A3}{A1 + A3 + B} \text{ expressed in mole \%}$$

where B is defined as $$\frac{A21 + A22 - A1 - f \times A3}{2}$$

wherein f is the nominal functionality of the intended polyol.

The polyols which may be used for reducing the level of unsaturation and the polyols according to the present invention have an average nominal functionality of 2–6, preferably 2–4, a number average equivalent weight of 1000–10000, preferably 1000–8000.

Suitable polyether polyols which can be employed include those which are prepared by reacting propylene oxide and optionally one or more other alkylene oxides with one or more active hydrogen containing initiator compounds. Suitable other alkylene oxides include for example ethylene oxide, tetrahydrofuran, butylene oxides, styrene oxide, epichlorhydrin and epibromhydrin; in particular ethylene oxide.

Suitable initiator compounds include, for example, water, ethylene glycol, propylene glycol, butanediol, hexanediol, glycerol, trimethylol propane, pentaerythritol, hexanetriol, hydroquinone, resorcinol, catechol, bisphenols, novolac resins, phosphoric acid, sorbitol and sucrose.

Further suitable initiators include, for example, ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diamino-diphenylmethane, 4,4'-diaminodiphenylmethane, 1,3-phenylenediamine, 1,4-phenylenediamine, naphtylene-1,5-diamine, 4,4'-di (methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene and 3,5,3',5'-tetraethyl-4,4'-diaminodiphenylmethane.

Most preferred polyols are polyoxypropylene polyols and poly(oxyethylene-oxypropylene) polyols, wherein the oxyethylene may be distributed randomly and/or in blocked form in the chain and/or at the end of the chain, having an average nominal functionality of 2–4, a number average equivalent weight of 1000–5000 and an oxypropylene content of at least 50% by weight calculated on the total amount of oxyalkylene units in the polyols.

Therefore these polyols preferably have an OH value of 10 to 60 mg KOH/g.

The term "average nominal hydroxyl functionality" is used herein to indicate the average functionality (number of hydroxyl groups per molecule) of the polyol composition on the assumption that the average functionality of the polyoxyalkylene polyols present therein is identical with the average functionality (number of active hydrogen atoms per molecule) of the initiator(s) used in their preparation.

The reduction of unsaturation is conducted by ultrafiltration which as such is known in the art, see EP 400554. The membranes used in the process according to the present invention have a molecular weight cut off of 1–25 K and preferably 1–20 K daltons.

Any type of filter having this molecular weight cut off may be used like filters from regenerated cellulose (e.g. Diaflo® membranes from Amicon), polyvinyl chloride, polyacrylonitrile, polycarbonate, polysulfone, polyamide, PVDF (polyvinyl difluoride) and dynel (a vinylchloride—acrylonitrile copolymer). The membrane may be in the form of a simple sheet which may have any form (e.g. circular), a spirally wound system, a plate and frame system, a supporting tube system or a hollow fibre system.

The ultrafiltration may be conducted batch-wise (one or more times) or continuously. In general the polyol which is to be treated can be used as such or is dissolved in a solvent which should be inert to the membrane and the polyol, water not being the sole solvent. Examples of solvents are methanol and ethanol and mixtures thereof and mixtures of these solvents with water in a 10/90–90/10 weight ratio.

Other solvents which dissolve the polyols are for instance acetone, tetrahydrofuran, dichloromethane, butanol and propanol. Further selection of suitable solvents is determined by their inertness towards the membrane system selected.

Preferably solutions containing 1–50% by weight of polyol are employed. The solution is brought into contact with the membrane at ambient temperature or, if desired, at elevated temperature provided the ultrafiltration device is able to withstand this temperature and the solution is allowed to pass the membrane by applying a pressure above atmospheric pressure, e.g. 0.2 MPa. During operation the solution may be stirred, if desired. Further solvent may be added to the solution during operation e.g. at the same rate at which solvent is passing the membrane. If further purification is desirable filtration may be continued or repeated. Finally the solution which did not pass the membrane (the concentrate) is removed from the filtration device and the polyol with the reduced amount of unsaturation is obtained by evaporating the solvent.

The polyols obtained may be used in the preparation of polyurethanes, in particular flexible foams.

Another advantage of the ultrafiltration purification is that certain low molecular weight impurities could be removed which impurities could cause an unpleasant smell in flexible foams.

Often polyether polyols of the type described above are prepared using certain catalysts, e.g. KOH or CsOH catalysts. After the polymerisation stage to prepare the polyols the active polyol chain may be neutralised in such a way that the metal remains in solution as a salt, e.g. K-adipate. By applying ultrafiltration the metal salt may be removed as well in a single step together with the compounds containing unsaturation.

The invention is illustrated by the following examples.

EXAMPLE 1

A polyether triol of OH value 28 mg KOH/g, made of PO and EO and containing 15% of ethylene oxide in tip position has been used as the starting product to be purified according to the process described in this invention.

The unsaturation level was 0.07 meq./g measured by the mercuri acetate method and the parameter Y measured from 13C NMR was $105 \times 10^{-3}$. The monool, diol and triol contents were 27, 17 and 56 mole % respectively. The derived molar ratios triol/monool and triol/diol were 2.07 and 3.29 respectively. A 2% solution of this product in methanol was prepared. 50 ml of this solution was introduced into an ultrafiltration stirred cell equipped with an ultrafiltration disc membrane of 10000 molecular weight cut-off (YM10 from the Amicon company). Approximately a pressure of 0.17 MPa was applied on the stirred cell and the filtration was allowed to run until the volume of the solution in the cell was reduced by a factor of five. The solution in the cell (the concentrate) was then rediluted to its initial volume by addition of fresh methanol and the filtration was repeated as above. From this final concentrate present in the cell at the end of the experiment, the methanol was evaporated and 0.86 g. of pure polyol was obtained. The total EO level of the product was 13.5% by weight and the ratio of unsaturated group over the total number of end groups (Y) was $9.10^{-3}$. The monool, diol and triol contents were 2, 19 and 79 mole % respectively. The molar ratio of triol:monool was 39.5, showing an improvement by a factor of approximately 19. The molar ratio of triol:diol was 4.16, showing a change by a factor of approximately 1.3 only.

EXAMPLE 2

The same polyol as used in example 1 was applied as starting material. A 20% solution of this product in methanol/water (50/50 w/w) was prepared. 2 liter of this solution was poured into a feed tank (15° C.). A diafiltration was conducted as follows. The filtration device was a Pellicon tangential flow system from Millipore having a horizontal membrane filter (surface area 0.46 m², membrane:Pellicon cassette from Millipore in regenerated cellulose with MW cut-off of 10.000). The solution is passing the membrane tangentially. A feed pump was used to feed the solution from the feed tank to the membrane. The inlet and outlet pressure of the Pellicon system were 0.55 and 0.21 MPa respectively. The permeate containing compounds having unsaturated groups was removed from the lower part of the membrane. The concentrate flowed from the upper part of the membrane back to the feed tank. A constant liquid level in the feed tank was maintained by feeding 14 l of 50/50 w/w water/methanol during the 4 hours the diafiltration was conducted.

Solvent was removed by evaporation. 350 g of purified polyol was obtained: OH value: 26 mg KOH/g, EO level 13.1% by weight; Y=0 (no unsaturation defectable by NMR); monool, triol and diol contents were 0, 0.5 and 99.5 mole % respectively; unsaturation level: 0.0045 (twice measured by mercury acetate method) meq/g.

We claim:

1. A process for reducing the level of unsaturation in a polyether polyol having an oxypropylene content of at least 30% by weight calculated on total amount of oxyalkylene units in the polyol and having a number average equivalent weight of at least 1000 wherein the reduction of the level of unsaturation is conducted by subjecting the polyol to ultrafiltration, the polyol having been added to an organic solvent prior to subjecting the polyether polyol to said ultrafiltration.

2. Process according to claim 1 wherein the filter used has a molecular weight cut-off of 1-25 K daltons.

3. The process of claim 1 wherein said organic solvent is selected from the group consisting of methanol, ethanol, butanol, propanol, tetrahydrofuran, dichloromethane and mixtures thereof.

4. The process of claim 3 wherein said organic solvent is selected from the group consisting of methanol, ethanol and mixtures thereof.

5. The process of claim 4 wherein said organic solvent is an aqueous organic solvent selected from the group consisting of a mixture of methanol in water and a mixture of ethanol in water.

6. The process of claim 5 wherein said mixture of methanol in water has a weight ratio of methanol to water of from 10/90 to 90/10.

7. The process of claim 6 wherein said weight ratio of methanol in water is 50/50.

8. The process of claim 5 wherein said mixture of ethanol in water has a weight ratio of ethanol to water of from 10/90 to 90/10.

* * * * *